United States Patent [19]

Taylor

[11] Patent Number: 5,067,511

[45] Date of Patent: Nov. 26, 1991

[54] HIGH PRESSSURE FLUID EMERGENCY SHUTOFF VALVE

[76] Inventor: Julian S. Taylor, 8300 SW. 8th, Oklahoma City, Okla. 73128

[21] Appl. No.: 695,830

[22] Filed: May 6, 1991

[51] Int. Cl.$^5$ ............................................. F16K 17/00
[52] U.S. Cl. ........................................ 137/67; 137/461
[58] Field of Search ................................... 137/67, 461

[56] References Cited

U.S. PATENT DOCUMENTS

| | | | |
|---|---|---|---|
| 4,240,458 | 12/1980 | Huff | 137/461 X |
| 4,724,857 | 2/1988 | Taylor | 137/67 |
| 4,727,903 | 3/1988 | Sturgis | 137/461 |
| 4,787,409 | 11/1988 | Taylor | 137/67 |

Primary Examiner—Robert G. Nilson
Attorney, Agent, or Firm—Robert K. Rhea

[57] ABSTRACT

An emergency shutoff valve for closing the upstream end portion of a high pressure fluid conductor in the event of unintentional closing the downstream end portion of the conductor is formed by a valve body interposed in the upstream end portion of the high pressure fluid conductor. The valve body contains a valve seat and a normally open valve for seating on the seat and interrupting fluid flow through the valve body in response to fluid pressure above a predetermined value in the conductor. The valve includes a stem slidably supported by and projecting, at one end portion, outwardly of the body. A top plate is secured to the body by posts in axial spaced relation with respect to the valve stem for supporting a pressure collapsible rod-like pin axially interposed between the top plate and the valve stem.

5 Claims, 2 Drawing Sheets

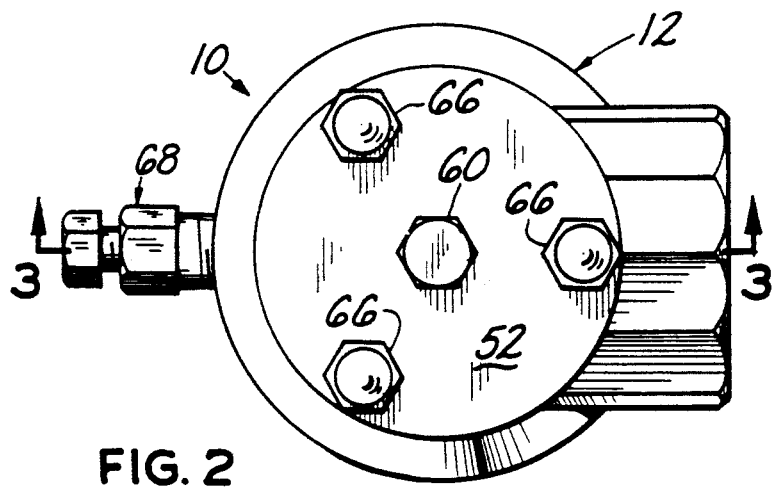
FIG. 2
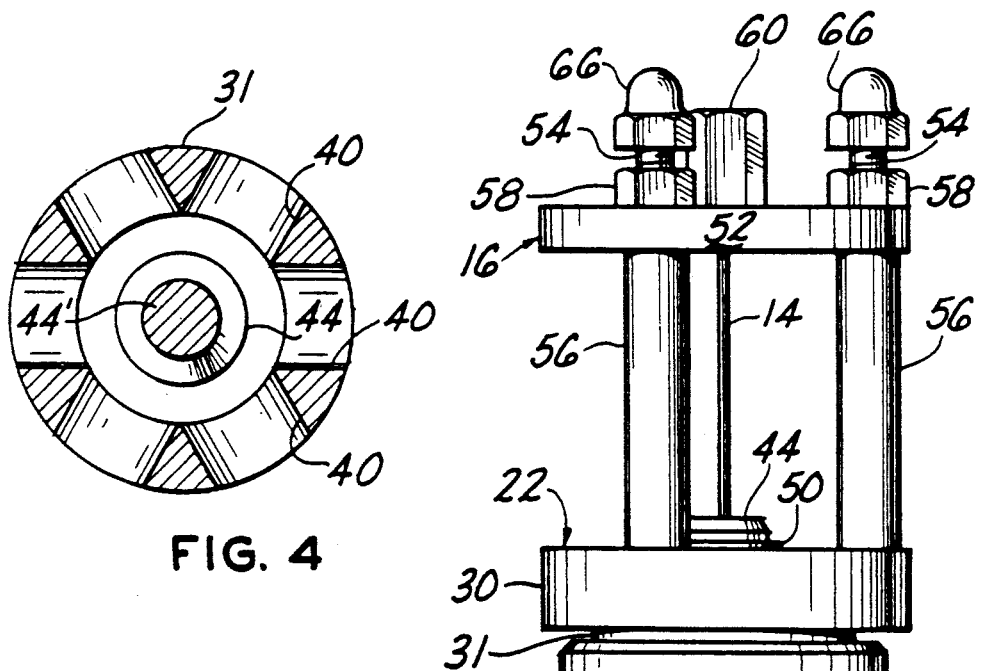
FIG. 4
FIG. 1

HIGH PRESSSURE FLUID EMERGENCY SHUTOFF VALVE

BACKGROUND OF THE INVENTION

1. Field of the Invention

This present invention relates to high pressure fluid conductors and more particularly to a valve interposed in a high pressure fluid line between the source of fluid pressure and downstream distribution lines.

In moving high pressure fluid from a source to a point of usage or for processing, it is desirable, from an economic view point, to utilize distribution line conductors capable of containing the flow of fluid under pressure but incapable of withstanding the pressures generated in the event of a malfunction of equipment or someone inadvertently closing a valve in the downstream end portion of the distribution line or lines. Such malfunction or inadvertent closing of a valve results in the distribution line rupturing and creating a dangerous situation for equipment or personnel.

This invention provides an emergency shutoff valve to be interposed in fluid conductors between the source of fluid under high pressure and a downstream distribution line or lines.

2. Description of the Prior Art

In industrial situations such, as described hereinabove, it has been common practice to install a pressure relief valve or valves in fluid conductor lines which, in the event of increase of pressure above a safe predetermined level, the relief valve opens to vent the fluid. However, this is undesirable where the high pressure fluid is toxic or is a valuable asset or may be environmentally unacceptable.

This invention overcomes the shortcomings of the prior art by providing a valve device which is interposed in a fluid conductor between the source and its connection with a distribution line so that in the event of downstream flow stoppage this valve immediately stops the fluid from entering the distribution line in response to a buildup of fluid pressure above a predetermined value.

SUMMARY OF THE INVENTION

A valve body, having inlet and outlet ports, is interposed in a fluid conducting line between the source of high pressure fluid and a downstream distribution line. A valve bonnet, threadedly engaged with the valve body, includes a valve seat interposed in the fluid passageway between the inlet and outlet ports. A valve, having a stem slidably received by the bonnet, has its valve head normally maintained unseated in an upstream direction with respect to the valve seat by a pressure collapsible pin axially abutting the valve stem opposite the valve head and supported, at its opposite end, by a top plate spaced from the valve bonnet by a plurality of bolts and spacers. In response to downstream fluid flow interruption, fluid pressure buildup biases the valve head downstream to its seat collapsing the pin and interrupting flow through the fluid passageway.

The principal object of this invention is to provide an emergency fluid flow shutoff valve in the event of flow interruption in the downstream end portion of a high pressure fluid conductor.

BRIEF DESCRIPTION OF THE DRAWINGS

FIG. 1 is a side elevation view of the valve;

FIG. 2 is a top view of FIG. 1;

DESCRIPTION OF THE PREFERRED EMBODIMENTS

Figure 3:
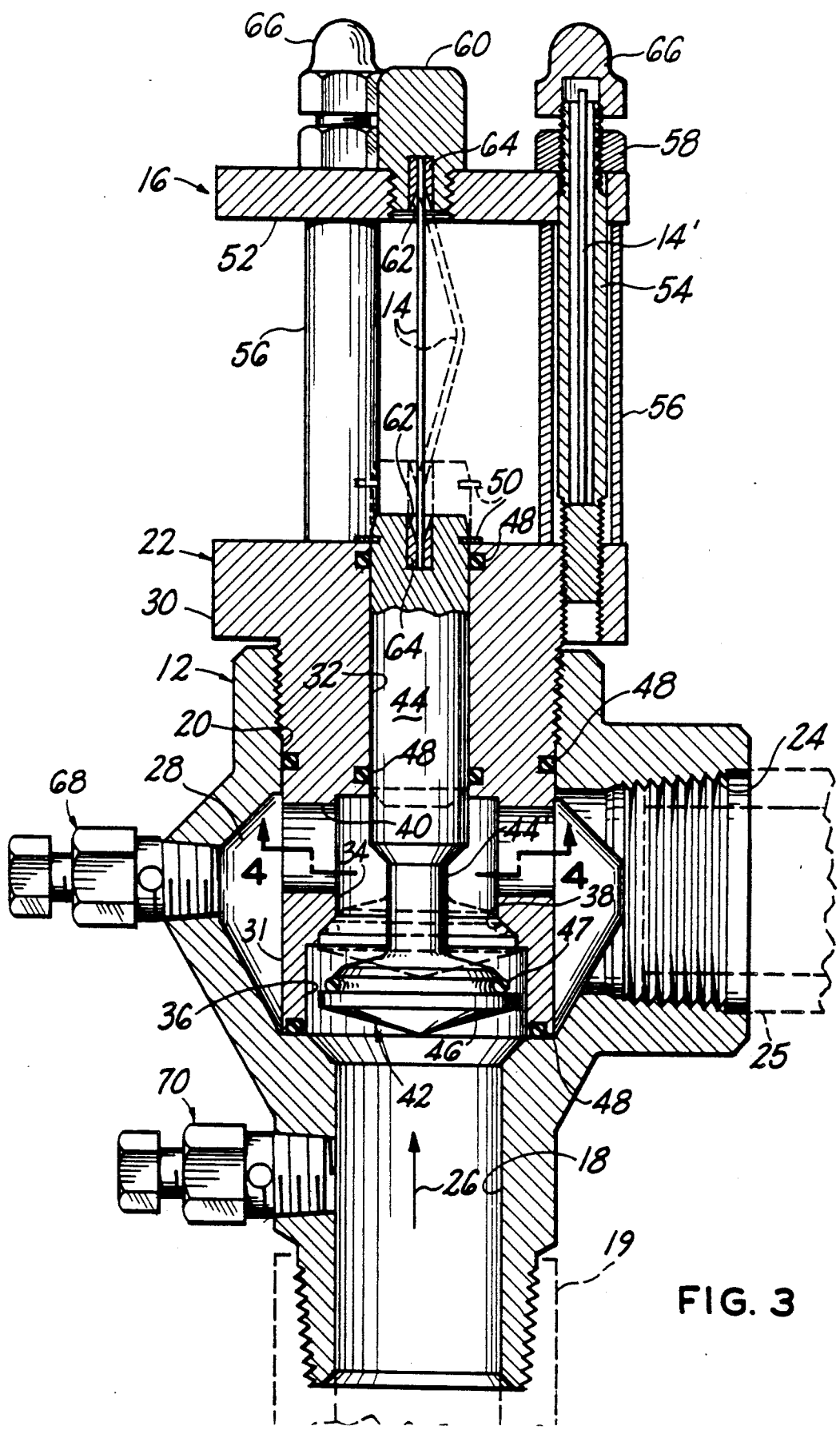
FIG. 3 is a vertical cross sectional view, partly in elevation, to a larger scale, taken substantially along the line 3—3 of FIG. 2; and, FIG. 4 is a horizontal cross sectional view, taken substantially along the line 4—4 of FIG. 3.

Like characters of reference designate like parts in those figures of the drawings in which they occur.

In the drawings:

The reference numeral 10 indicates the valve, as a whole, including a body 12 and a fluid pressure collapsible pin 14 normally supported by pin cage means 16. The valve body is longitudinally bored to form an inlet port 18 axially connected with a source of fluid under greater than atmospheric pressure, indicated by the broken lines 19. The valve body is counterbored from its opposite end, as at 20, for threadedly receiving a valve bonnet 22. The valve body is further provided with an outlet port 24 for axial connection with a distribution line 25. The inlet and outlet ports define a fluid passageway 26 through the body 12. The passageway 26 is enlarged, at the intersection of the ports 18 and 24, to form a chamber 28 and insure an adequate volume of fluid flow through the valve body across the position of the valve, as presently described.

The valve bonnet has a head end portion 30 and a stem portion 31 of reduced diameter entering the body counterbore 20. The bonnet is longitudinally bored, as at 32, and counterbored from its inner end, as at 34 and 36, to form a annular upstream facing valve seat 38 at the inner limit of the counterbored 36. The bonnet stem is provided with a plurality of transverse bores 40 (FIG. 4) in the area of its counterbore 24 and forms a portion of the fluid passageway 26.

A valve 42, having an elongated stem portion 44 slidably received by the bonnet bore 32, includes a valve head 46 which seats and unseats on the valve seat 38 when the valve stem is moved longitudinally relative to the bonnet. The valve head 46 includes a valve seat containing 0-ring 47 for insuring a fluid tight seal. The stem is diametrically reduced, as at 44', adjacent the valve head 46 to maintain fluid passageway flow volume.

A plurality of 0-rings 48 seal the bonnet stem with the valve body and the valve stem 44 with the bore 32 of the bonnet. A snap ring 50, surrounding the outward end portion of the valve stem, prevents complete insertion of the valve stem into the bonnet 22.

The pin cage means 16 comprises a top plate 52 maintained in parallel axial spaced relation with respect to the bonnet head 30 by a plurality of posts 54 projecting through cooperating bores in the top plate 52 and threadedly engaged with the bonnet head 30 in radial and circumferential equally spaced relation. A like plurality of sleeves 56 respectively surround the posts 54 and a post nut 58 is threadedly connected with the end of the respective post opposite the bonnet head 30. The top plate 52 is centrally bored and threaded for receiving a pin supporting nut 60. The confronting ends of the pin holding nut 60 and the valve stem 44 are coaxially drilled to form sockets 62 respectively receiving pin guide inserts 64 for nesting the respective end portion of the pin 14. Each of the posts 54 are axially drilled from their ends opposite the valve bonnet for receiving spare pins 14' which are maintained within the respective post by acorn nuts or caps 66.

A pair of conventional bleed valves 68 and 70 are respectively connected with the valve body on the downstream and upstream side of the valve seat 38 for the purposes presently explained.

OPERATION

In operation, the valve assembled as described hereinabove is interposed in the fluid conducting lines 19 and 25. In the event of interruption of flow in the downstream distribution line 25, fluid pressure buildup in the valve passageway 26 acts on the area of the stem 44 referenced to atmosphere and results in an axial force that is resisted by pin 14. When the axial force reaches the buckling point of the pin, as determined by Euler's law, longitudinal valve closing movement of the valve stem 44 in the bonnet collapses the pin 14 and interrupts fluid flow through the passageway 26.

In order to correct a malfunction or the problem in the downstream distribution line 25, the bleed valve 68 may be opened to release high pressure fluid contained by the valve 10 and its distribution line 25. After the problem has been corrected the upstream fluid pressure against the valve head 46 is shut off and the other bleed valve 70 is opened to release fluid pressure in the upstream end of the valve fluid passageway. Thereafter, the valve 42 may be manually reset manually by moving its stem 44 in an upstream direction to unseat the valve head. The snap ring 50 interrupts the upstream movement of the valve stem. The damaged pin 14 is removed by removing the pin holding nut 60 and a new pin 14' is obtained from one of the posts 54 and inserted between the pin holding nut 60 and valve stem. Thereafter the upstream fluid may be released to continue its flow through the passageway 26.

Obviously the invention is susceptible to changes or alterations without defeating its practicability. Therefore, I do not wish to be confined to the preferred embodiment shown in the drawings and described herein.

I claim:

1. A high pressure fluid flow line emergency shutoff valve, comprising:
    a valve body having an inlet port and an outlet port forming a fluid passageway interposed in the flow line;
    a valve seat intersecting the fluid passageway;
    normally open valve means movably supported by said body for movement toward said valve seat and closing the fluid passageway; and,
    axially collapsible pin means for normally biasing said valve means toward a fluid passageway open position and releasing said valve means for seating on said valve seat in response to a predetermined value of fluid pressure in the fluid passageway.

2. The shutoff valve according to claim 1 in which said valve means comprises:
    a valve head for seating on said valve seat; and,
    a valve stem slidably supported by said body and having an end portion projecting outwardly of the body.

3. The shutoff valve according to claim 2 in which said pin means comprises:
    pin cage means including a top plate secured to said body in axial outstanding relation with respect to the outwardly projecting end portion of said valve stem; and, an elongated rod-like pin axially extending between said valve stem end portion and said top plate.

4. The shutoff valve according to claim 3 in which said pin cage means further includes:
    a plurality of post means surrounding said pin in radially spaced relation for connecting said top plate with said valve body.

5. The shutoff valve according to claim 4 and further including:
    fluid pressure bleed valve means connected with said body and communicating with the fluid passageway on the upstream and downstream side of said valve seat, respectively.

* * * * *